(12) United States Patent
Yun

(10) Patent No.: US 9,299,969 B2
(45) Date of Patent: Mar. 29, 2016

(54) SECONDARY BATTERY

(71) Applicant: SAMSUNG SDI CO., LTD., Yongin-si, Gyeonggi-do (KR)

(72) Inventor: Jiwon Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 245 days.

(21) Appl. No.: 13/654,356

(22) Filed: Oct. 17, 2012

(65) Prior Publication Data

US 2014/0017555 A1   Jan. 16, 2014

Related U.S. Application Data

(60) Provisional application No. 61/669,951, filed on Jul. 10, 2012.

(51) Int. Cl.
| H01M 2/08 | (2006.01) |
| H01M 2/22 | (2006.01) |
| H01M 2/04 | (2006.01) |
| H01M 2/06 | (2006.01) |
| H01M 2/26 | (2006.01) |

(52) U.S. Cl.
CPC ............. *H01M 2/22* (2013.01); *H01M 2/0404* (2013.01); *H01M 2/06* (2013.01); *H01M 2/263* (2013.01)

(58) Field of Classification Search
None
See application file for complete search history.

(56) References Cited

U.S. PATENT DOCUMENTS

| 5,378,557 A * | 1/1995 | Murata et al. ................. 429/127 |
| 2004/0151952 A1 * | 8/2004 | Brady et al. .................... 429/12 |
| 2006/0127774 A1 * | 6/2006 | Kim et al. ...................... 429/246 |
| 2006/0228620 A1 * | 10/2006 | Martinson et al. .............. 429/56 |
| 2006/0292442 A1 * | 12/2006 | Shah et al. ..................... 429/181 |
| 2009/0136841 A1 * | 5/2009 | Watanabe et al. ............. 429/174 |
| 2010/0068616 A1 * | 3/2010 | Uh ................................ 429/163 |
| 2011/0183192 A1 | 7/2011 | Kim |

FOREIGN PATENT DOCUMENTS

| JP | 2006-185692 A | 7/2006 |
| KR | 2009-0053708 A | 5/2009 |
| KR | 2011-0087562 A | 8/2011 |

* cited by examiner

Primary Examiner — Patrick Ryan
Assistant Examiner — Jose Colucci Rios
(74) Attorney, Agent, or Firm — Lewis Roca Rothgerber Christie LLP

(57) ABSTRACT

A secondary battery including an electrode assembly; a case containing the electrode assembly; a cap plate sealing an opening of the case; a terminal plate electrically connected to the electrode assembly; an electrode terminal electrically connected to the terminal plate; and an insulation layer between the cap plate and the terminal plate and electrically insulating the cap plate and the terminal plate from each other, and the terminal plate includes a first metal layer connected to the electrode terminal, and a second metal layer on the first metal layer, the second metal layer being between the first metal layer and the insulation layer.

19 Claims, 3 Drawing Sheets

SECONDARY BATTERY

CROSS-REFERENCE TO RELATED APPLICATION

This application claims priority to and the benefit of U.S. Provisional Application No. 61/669,951, filed on Jul. 10, 2012 in the U.S. Patent and Trademark Office, the entire content of which is incorporated herein by reference.

BACKGROUND

1. Field

Aspects of embodiments of the present invention relate to a secondary battery.

2. Description of the Related Art

Unlike a primary battery that is not rechargeable, a rechargeable, secondary battery can be charged and discharged. A low-capacity battery having a battery cell packaged into a pack is widely used in small portable electronic devices, such as a cellular phone or a camcorder.

The secondary battery typically employs a lithium-based oxide as a first electrode active material, and a carbon material as a second electrode active material. In addition, the secondary battery is manufactured in various shapes, generally including a cylindrical, prismatic, or pouch type.

The secondary battery generally includes a can, an electrode assembly accommodated in the can, and a cap assembly sealing an upper portion of the can. As an end product is becoming highly functional, it is desirable to increase a capacity of the secondary battery. It is also desirable to improve assembling efficiency of the secondary battery by simplifying its internal structure.

SUMMARY

According to aspects of embodiments of the present invention, a secondary battery has improved assembling efficiency and an increased capacity.

According to an embodiment of the present invention, a secondary battery includes: an electrode assembly; a case containing the electrode assembly; a cap plate sealing an opening of the case; a terminal plate electrically connected to the electrode assembly; an electrode terminal electrically connected to the terminal plate; and an insulation layer between the cap plate and the terminal plate and electrically insulating the cap plate and the terminal plate from each other, and the terminal plate includes a first metal layer connected to the electrode terminal, and a second metal layer on the first metal layer, the second metal layer being between the first metal layer and the insulation layer.

The first metal layer may be formed of a first metal, and the second metal layer may be formed of a second metal different from the first metal.

An oxide layer may be formable on an outer surface of the second metal layer.

The insulation layer may be formed on the second metal layer.

The insulation layer may be formed on a surface of the cap plate.

The insulation layer may have a thickness of 5 μm to 300 μm.

The insulation layer may include aluminum oxide.

The insulation layer may include an oxidized surface of at least one of the terminal plate or the cap plate.

The secondary battery may further include a sealing layer between the insulation layer and the cap plate. The sealing layer may include at least one of a synthetic resin or a double synthetic rubber.

In one embodiment, the second metal layer is formed on the first metal layer, the insulation layer is formed on the second metal layer, and the sealing layer is formed on the insulation layer.

The electrode assembly may include a first electrode plate electrically coupled to the electrode terminal through the terminal plate, and a second electrode plate electrically coupled to the cap plate. The electrode assembly may further include a first electrode tab connected between the first electrode plate and the first metal layer, and a second electrode tab connected between the second electrode plate and the cap plate.

The first metal layer may include nickel.

The second metal layer may include aluminum.

The first metal layer and the second metal layer may be integrally formed by at least one of hot rolling or cold rolling.

The first metal layer, the second metal layer, and the insulation layer may be integrally formed. The integrally formed first metal layer, second metal layer, and insulation layer may be coupled to and contact the cap plate.

The terminal plate may include bent portions at opposite sides of the terminal plate. The terminal plate may have a plate shape that is substantially parallel to the cap plate, and the bent portions may be bent in a direction away from the cap plate.

According to another embodiment of the present invention, a secondary battery includes: a case having a space in its inside, an electrode assembly inserted into the space of the case and having a first electrode tab and a second electrode tab, a terminal plate connected to the first electrode tab of the electrode assembly and having a first metal layer and a second metal layer made of a different material from the first metal layer, and a cap plate connected to the second electrode tab of the electrode assembly and formed on an upper portion of the terminal plate to seal the case, and an insulation layer is formed between the terminal plate and the cap plate.

The insulation layer may have a thickness of 5 μm to 300 μm.

In one embodiment, an oxide film may not be formed on a surface of the first metal layer of the terminal plate.

The first metal layer may be made of nickel (Ni).

In one embodiment, the insulation layer may be formed by oxidizing the second metal layer of the terminal plate.

In one embodiment, the second metal layer may be made of aluminum (Al).

In one embodiment, the insulation layer may be made of aluminum oxide ($Al_2O_3$).

In one embodiment, the insulation layer may be formed by oxidizing a bottom surface of the cap plate.

In one embodiment, a sealing layer for correcting a height deviation of the insulation layer may further be formed between the insulation layer and the cap plate.

In one embodiment, the sealing layer may be made of a synthetic resin, or a double synthetic rubber, such as ethylene propylene diene monomer (EPDM).

According to an aspect of embodiments of the present invention, a secondary battery has an insulating property by forming the terminal plate including a first metal layer and a second metal layer made of a different material from the first metal layer and forming an insulation layer on the second metal layer using an oxide coating. Therefore, it is not necessary to separately provide an insulator between the terminal plate and the cap plate, thereby reducing the number of components required, improving assembling efficiency, and efficiently utilizing a space to increase a capacity of the battery.

According to another aspect of embodiments of the present invention, the secondary battery according to the present invention can achieve an insulating property by forming the terminal plate consisting of a first metal layer and a second metal layer made of a different material from the first metal layer and forming an insulation layer on the second metal layer using an oxide coating. Therefore, it is not necessary to separately provide an insulator between the terminal plate and the cap plate, thereby reducing the number of components required, improving assembling efficiency, and securing a space to increase a capacity of the battery.

According to another aspect of embodiments of the present invention, a secondary battery includes an insulation layer constituting the terminal plate by oxidizing an external portion of the second metal layer to be integrally formed with the second metal layer to establish a secure connection therebetween, thereby improving sealing efficiency.

According to another aspect of embodiments of the present invention, a secondary battery has a sealing layer formed on the insulation layer, such that a height deviation of the insulation layer may be compensated, thereby tightly sealing the insulation layer on the cap plate to establish a secure connection.

BRIEF DESCRIPTION OF THE DRAWINGS

The accompanying drawings, together with the specification, illustrate some exemplary embodiments of the present invention, and, together with the description, serve to explain principles and aspects of the present invention.

Figure 1:
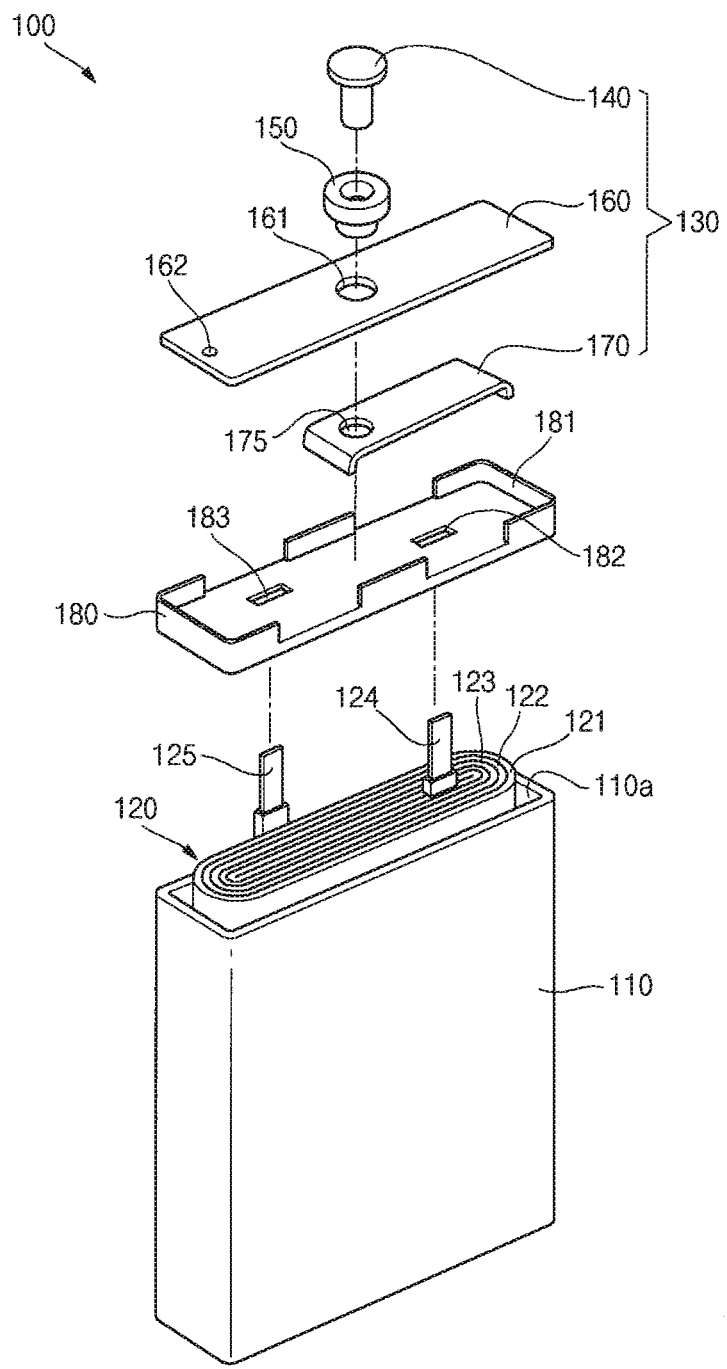
FIG. 1 is an exploded perspective view of a secondary battery according to an embodiment of the present invention.

Description of Reference Numerals Indicating
Some Elements in the Drawings

| | |
|---|---|
| 100: Secondary battery | 110: Case |
| 120: Electrode assembly | 130: Cap assembly |
| 140: Electrode terminal | 150: Gasket |
| 160: Cap plate | 170: Terminal plate |
| 180: Insulation case | |

DETAILED DESCRIPTION

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 2:
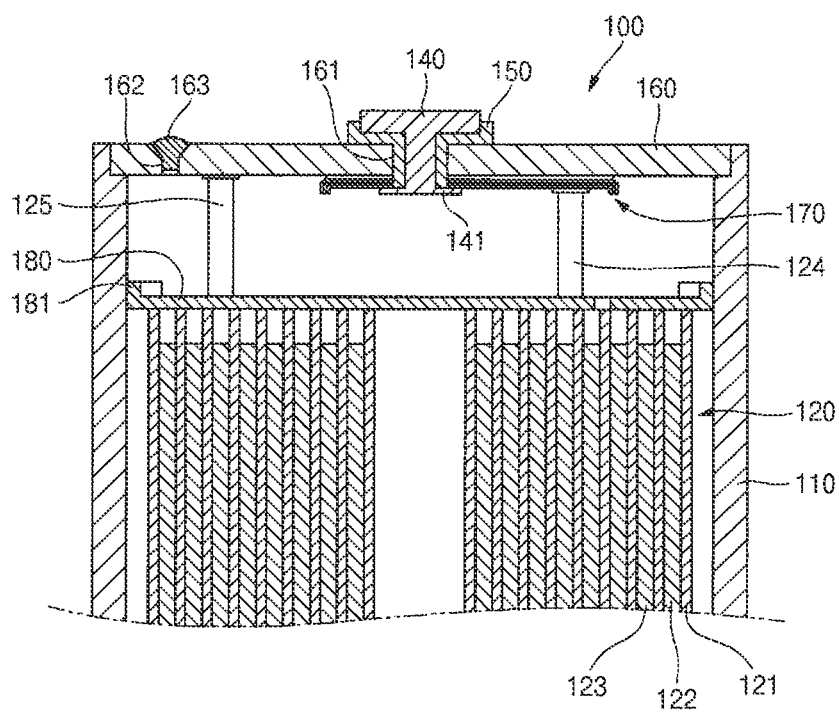
FIG. 2 is a cross-sectional view of the secondary battery of FIG. 1.
Figure 3:
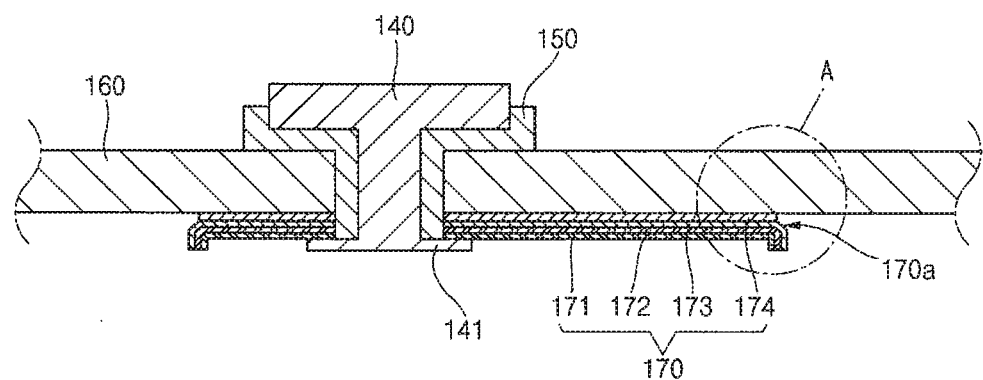
FIG. 3 is a partial cross-sectional view showing a connection between a terminal, a cap plate, and a terminal plate of the secondary battery of FIG. 1.
Figure 4:
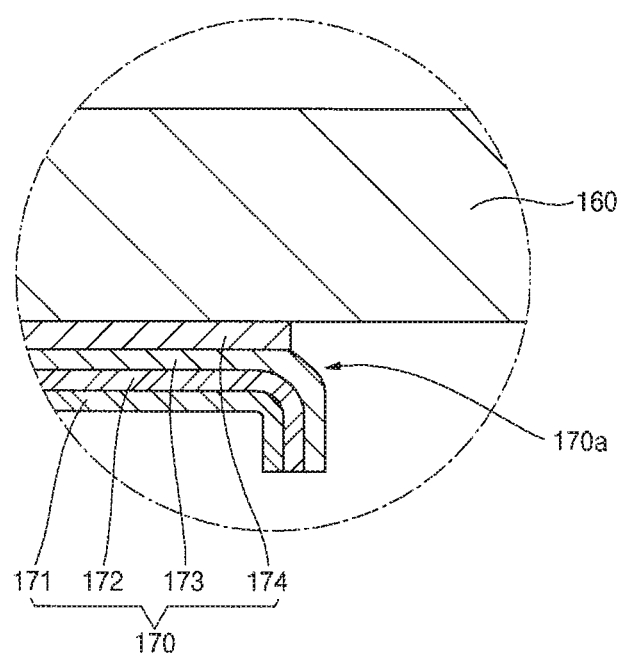
FIG. 4 is an enlarged view of a region "A" of FIG. 3.

FIG. 1 is an exploded perspective view of a secondary battery according to an embodiment of the present invention; FIG. 2 is a cross-sectional view of the secondary battery of FIG. 1; FIG. 3 is a partial cross-sectional view showing a connection between a terminal, a cap plate, and a terminal plate of the secondary battery of FIG. 1; and FIG. 4 is an enlarged view of a region "A" of FIG. 3.

Referring to FIGS. 1 to 4, a secondary battery 100 according to an embodiment of the present invention includes a case 110, an electrode assembly 120, a cap assembly 130, an electrode terminal 140, a gasket 150, a cap plate 160, a terminal plate 170, and an insulation case 180.

The case 110, in one embodiment, is made of a metallic material, such as aluminum or an alloy thereof, and may be formed by a deep drawing method. The case 110 may have a substantially planar bottom surface. In one embodiment, the case 110 is made of a metallic material and may function as a terminal, such as a positive electrode terminal, for example. The case 110 has an opening 110a. The electrode assembly 120 is accommodated in the case 110 through the opening 110a, and the opening 110a is later sealed by the cap plate 160.

The electrode assembly 120 may be formed in a jelly roll configuration in which a separator 122 is interposed between a first electrode plate 121 and a second electrode plate 123 and wound together. In one embodiment, a first electrode tab 124 is coupled to the first electrode plate 121 and protrudes from an end (e.g., an upper end) of the electrode assembly 120, and a second electrode tab 125 is coupled to the second electrode plate 123 and protrudes from an end (e.g. the upper end) of the electrode assembly 120. The first electrode tab 124 and the second electrode tab 125 are spaced apart from each other by a distance (e.g., a predetermined distance) to be electrically insulated. The first and second electrode plates 121 and 123 of the electrode assembly 120 may be reversed according to the configuration of the secondary battery.

The cap assembly 130, in one embodiment, includes the electrode terminal 140, the cap plate 160, and the terminal plate 170. The gasket 150 may further be installed between the electrode terminal 140 and the cap plate 160. The cap assembly 130 may be coupled to the separately formed insulation case 180 and then coupled to the opening 110a formed at an end (e.g., an upper end) of the case 110, such that the cap assembly 130 seals the opening 110a of the case 110.

The electrode terminal 140, in one embodiment, is inserted into a terminal through hole 161 of the cap plate 160. The electrode terminal 140 may be inserted into the terminal through hole 161 together with the gasket 150 having a tubular shape, such that the electrode terminal 140 and the cap plate 160 are electrically insulated from each other by the gasket 150. The electrode terminal 140 is connected to the first electrode tab 124 of the electrode assembly 120 through the terminal plate 170 to function as a first electrode terminal (e.g., a negative electrode). Alternatively, the electrode terminal 140 may be coupled to the second electrode tab 125 connected to the second electrode plate 123 to function as a second electrode terminal.

The gasket 150, in one embodiment, penetrates the terminal through hole 161 of the cap plate 160 together with the electrode terminal 140. The gasket 150 covers an inner wall of the terminal through hole 161 to prevent or substantially prevent the electrode terminal 140 from directly contacting the cap plate 160 in the terminal through hole 161. The gasket 150 electrically insulates the electrode terminal 140 from the cap plate 160, thereby preventing or substantially preventing an electrical short circuit. The gasket 150 may be made of an electrically insulating material. In addition, the gasket 150 prevents or substantially prevents an electrolyte in the case 110 from leaking through the terminal through hole 161.

The cap plate 160 may be formed of a metal plate having a size and shape corresponding to the opening 110a of the case 110. The terminal through hole 161 having a size (e.g., a predetermined size) is formed in the cap plate 160 (e.g., at a center of the cap plate 160), and the electrode terminal 140 and the gasket 150 are inserted into the terminal through hole 161. The electrode terminal 140 and the gasket 150 may further be inserted into a through hole 175 of the terminal plate 170.

The cap plate 160, in one embodiment, is connected to the second electrode tab 125 of the electrode assembly 120, which penetrates or extends beyond a periphery of the insulating terminal plate 170, such that the cap plate 160 may function as a second electrode (e.g., a positive electrode). Alternatively, the cap plate 160 may be connected to the first electrode tab 124 of the electrode assembly 120, such that the cap plate 160 may function as a first electrode. The cap plate 160 may be connected to have a polarity opposite to that of the electrode terminal 140.

The cap plate 160 is electrically insulated from the electrode terminal 140, and the cap plate 160 is electrically insulated from the terminal plate 170 connected to the electrode terminal 140. The terminal plate 170 is tightly coupled to the cap plate 160 and has an upper region contacting the cap plate 160 and formed as an electrical insulator, such that the terminal plate 170 is electrically insulated from the cap plate 160.

The terminal plate 170 is arranged at a lower portion of the cap plate 160 while tightly contacting the cap plate 160. The first electrode tab 124 of the electrode assembly 120 is coupled to the terminal plate 170, such that the terminal plate 170 may function as a first electrode. In one embodiment, the terminal plate 170 may be coupled to the second electrode tab 125 of the electrode assembly 120 and is electrically insulated from the cap plate 160 functioning as a second electrode.

The terminal plate 170, in one embodiment, includes a first metal layer 171, a second metal layer 172 formed on the first metal layer 171, and an insulation layer 173 formed on the second metal layer 172. In one embodiment, the terminal plate 170 may further include a sealing layer 174 formed on the insulation layer 173.

The first metal layer 171 may be formed to have a plate shape and is made of a first metal material. In one embodiment, the first metal layer 171 is made of a metal that allows the first metal layer 171 to maintain its shape without being oxidized when the insulation layer 173 is formed by oxidizing the second metal layer 172 to then be electrically connected to the first electrode tab 124. The first metal layer 171 is electrically connected between the first electrode tab 124 and the electrode terminal 140. In one embodiment, the first metal later 171 is connected to a lower portion 141 of the electrode terminal 140 that may have a rivet shape, for example. The first metal layer 171, in one embodiment, may be made of nickel (Ni). However, the first metal layer 171 may be made of any other suitable material that does not react during oxidation of the second metal layer 172.

The second metal layer 172 is formed on an upper surface of the first metal layer 171. The second metal layer 172, in one embodiment, is made of a different metal material from the first metal layer 171. In one embodiment, the second metal layer 172 is made of a material capable of forming the insulation layer 173 by forming an oxide coating on its outer surface. In one embodiment, the second metal layer 172 may be made of aluminum (Al). However, the second metal layer 172 may be made of any other suitable metal material that can form an insulation layer by forming an oxide film.

The second metal layer 172 may be provided to contact a top surface of the first metal layer 171 and then coupled to the first metal layer 171 by hot rolling or cold rolling. In one embodiment, the second metal layer 172 may be provided on the first metal layer 171 to have a same plate shape as the first metal layer 171 and then integrally coupled to the first metal layer 171, such as by rolling.

The insulation layer 173, in one embodiment, is formed on the second metal layer 172. The insulation layer 173 may be formed by coating an oxide coating by oxidizing the second metal layer 172. In order to form the insulation layer 173, the second metal layer 172 may be chemically anodized or electrically anodized. When the second metal layer 172 is made of aluminum (Al), the insulation layer 173 may be made of aluminum oxide ($Al_2O_3$) prepared by oxidizing aluminum (Al).

In one embodiment, the insulation layer 173 is made of aluminum oxide ($Al_2O_3$), which is a densely formed oxide having excellent corrosion resistance. In one embodiment, the insulation layer 173 is formed by oxidizing an external portion of the second metal layer 172 and is integrally formed with the second metal layer 172, thereby establishing a secure connection between the second metal layer 172 and the insulation layer 173. Therefore, the secondary battery 100 has improved sealing efficiency. In addition, since the insulation layer 173 is an electrical insulator, the terminal plate 170 and the cap plate 160 may be electrically insulated from each other.

Since the secondary battery 100 according to an embodiment of the present invention includes the insulation layer 173, it is not necessary to provide a separate insulator between the cap plate 160 and the terminal plate 170. Therefore, according to an embodiment of the present invention, compared to a conventional battery having a separate insulator, the number of components required to manufacture the secondary battery 100 according to the present invention is reduced, while increasing battery capacity by saving space. In addition, since a separate insulator is not necessary, a height of the cap assembly 130 may be reduced in the secondary battery 100 according to an embodiment of the present invention, thereby achieving a compact battery.

The insulation layer 173, in one embodiment, has a thickness of 5 μm to 300 μm. If the thickness of the insulation layer 173 is greater than or equal to 5 μm, an electrically insulating property of the insulation layer 173 is easily achieved. If the thickness of the insulation layer 173 is less than or equal to 300 μm, it is easy to reduce a processing time for forming the insulation layer 173 and a height of the cap assembly 130. In one embodiment, opposite sides of the terminal plate 170 having the first metal layer 171, the second metal layer 172, and the insulation layer 173 are bent, forming bent portions 170a. The bent portions 170a allow various components to be securely connected, thereby preventing or substantially preventing the components from being separated from each other.

In one embodiment, although not separately shown, the insulation layer 173 may be formed on a lower surface of the cap plate 160, rather than being formed on the terminal plate 170. In another embodiment, the insulation layer 173 may be formed on both the terminal plate 170 and the cap plate 160.

The sealing layer 174 may be formed on the insulation layer 173. The sealing layer 174 is formed between the insulation layer 173 and the cap plate 160 and may correct or compensate for a height deviation of the insulation layer 173, thereby allowing the insulation layer 173 to be tightly coupled to the cap plate 160. The sealing layer 174, in one embodiment, may be formed by coating an organic material on the insulation layer 173 or impregnating the terminal plate 170 having the insulation layer 173 with an organic material. In one embodiment, the sealing layer 174 may be made of a synthetic resin, or a double synthetic rubber such as ethylene propylene diene monomer (EPDM).

The insulation case 180 may be coupled to a bottom surface of the cap plate 160 and may be made of an insulating material. The insulation case 180, in one embodiment, may be arranged on the electrode assembly 120 and may have a sidewall 181 at its edge to be fixed on an inner surface of the case 110, such that the insulation case 180 may prevent or substantially prevent the electrode assembly 120 from moving. In one embodiment, the insulation case 180 includes a first terminal through hole 182 at a location corresponding to the first electrode tab 124 of the electrode assembly 120, and a second terminal through hole 183 at a location corresponding to the second electrode tab 125. The first electrode tab 124 penetrates the first terminal through hole 182 of the insulation case 180 to be coupled to the terminal plate 170, and the second electrode tab 125 penetrates the second terminal through hole 183 of the insulation case 180 to be coupled to the cap plate 160.

As described above, in the secondary battery 100 according to an embodiment of the present invention, an insulating property is achieved by the terminal plate 170 including the first metal layer 171 and the second metal layer 172 made of a different material from the first metal layer 171 and forming an insulation layer of an oxide layer on the second metal layer 172. As such, the secondary battery 100 does not have a separately provided insulator between the terminal plate 170 and the cap plate 160, thereby reducing the number of components required, improving assembling efficiency, and securing a space to increase a capacity of battery.

In one embodiment, since the insulation layer 173 is formed by oxidizing an external portion of the second metal layer 172, the insulation layer 173 is integrally formed with the second metal layer 172 to establish a secure connection, thereby improving sealing efficiency of the secondary battery 100.

The secondary battery 100 according to an embodiment of the present invention further includes the sealing layer 174 formed on the insulation layer 173, thereby correcting or compensating for a height deviation of the insulation layer 173 and allowing the insulation layer 173 to be tightly coupled to the cap plate 160.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
an electrode assembly;
a case containing the electrode assembly;
a cap plate sealing an opening of the case;
a terminal plate electrically connected to the electrode assembly;
an electrode terminal electrically connected to the terminal plate; and
an insulation layer between the cap plate and the terminal plate and electrically insulating the cap plate and the terminal plate from each other,
wherein the terminal plate comprises:
a first metal layer connected to the electrode terminal; and
a second metal layer on the first metal layer, the second metal layer being between the first metal layer and the insulation layer,
wherein the first metal layer has a plate shape formed of a first metal, and the second metal layer is formed of a second metal different from the first metal, and
wherein the insulation layer comprises an oxide layer, and each of the second metal layer and the oxide layer overlap the first metal layer, the oxide layer covering an entire side of the second metal layer that is facing the cap plate and between the first metal layer and the cap plate.

2. The secondary battery of claim 1, wherein the oxide layer is formed on an outer surface of the second metal layer.

3. The secondary battery of claim 1, wherein the insulation layer is formed on the second metal layer.

4. The secondary battery of claim 1, wherein the insulation layer is formed on a surface of the cap plate.

5. The secondary battery of claim 1, wherein the insulation layer has a thickness of 5 μm to 300 μm.

6. The secondary battery of claim 1, wherein the insulation layer comprises aluminum oxide.

7. The secondary battery of claim 1, wherein the insulation layer comprises an oxidized surface of at least one of the terminal plate or the cap plate.

8. The secondary battery of claim 1, further comprising a sealing layer between the insulation layer and the cap plate.

9. The secondary battery of claim 8, wherein the sealing layer comprises at least one of a synthetic resin or a double synthetic rubber.

10. The secondary battery of claim 8, wherein the second metal layer is formed on the first metal layer, the insulation layer is formed on the second metal layer, and the sealing layer is formed on the insulation layer.

11. The secondary battery of claim 1, wherein the electrode assembly comprises a first electrode plate electrically coupled to the electrode terminal through the terminal plate, and a second electrode plate electrically coupled to the cap plate.

12. The secondary battery of claim 11, wherein the electrode assembly further comprises a first electrode tab connected between the first electrode plate and the first metal layer, and a second electrode tab connected between the second electrode plate and the cap plate.

13. The secondary battery of claim 1, wherein the first metal layer comprises nickel.

14. The secondary battery of claim 1, wherein, the second metal layer comprises aluminum.

15. The secondary battery of claim 1, wherein the first metal layer and the second metal layer are integrally formed by at least one of hot rolling or cold rolling.

16. The secondary battery of claim 1, wherein the first metal layer, the second metal layer, and the insulation layer are integrally formed.

17. The secondary battery of claim 16, wherein the integrally formed first metal layer, second metal layer, and insulation layer is coupled to and contacts the cap plate.

18. The secondary battery of claim 1, wherein the terminal plate comprises bent portions at opposite sides of the terminal plate.

19. The secondary battery of claim 18, wherein the terminal plate has a plate shape that is substantially parallel to the cap plate, and the bent portions are bent in a direction away from the cap plate.

* * * * *